US011884326B2

(12) United States Patent
Watanabe et al.

(10) Patent No.: US 11,884,326 B2
(45) Date of Patent: Jan. 30, 2024

(54) VEHICLE BODY REAR STRUCTURE

(71) Applicant: HONDA MOTOR CO., LTD., Tokyo (JP)

(72) Inventors: Ukyo Watanabe, Tokyo (JP); Norikazu Matsuura, Tokyo (JP); Shunta Suzuki, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 90 days.

(21) Appl. No.: 17/671,644

(22) Filed: Feb. 15, 2022

(65) Prior Publication Data

US 2022/0289297 A1    Sep. 15, 2022

(30) Foreign Application Priority Data

Mar. 15, 2021  (JP) ................. 2021-041176

(51) Int. Cl.
  *B62D 21/15*    (2006.01)
  *B62D 25/20*    (2006.01)
  (Continued)

(52) U.S. Cl.
  CPC ....... *B62D 21/152* (2013.01); *B62D 25/2027* (2013.01); *B60K 15/067* (2013.01);
  (Continued)

(58) Field of Classification Search
  CPC .. B62D 21/152; B62D 25/2027; B62D 21/11; B62D 25/20; B62D 21/155; B60K 15/067; B60K 2015/03375; B60K 2015/0634
  (Continued)

(56) References Cited

U.S. PATENT DOCUMENTS 8,282,146 B2 * 10/2012 Izutsu ................. B62D 25/087
                                                      296/187.11
9,139,229 B2 *  9/2015 Mikami ............... B60K 15/063
                    (Continued)

FOREIGN PATENT DOCUMENTS

CN        1715117       1/2006
CN       102343939      2/2012
                    (Continued)

OTHER PUBLICATIONS

Japanese Notice of Allowance for Japanese Patent Application No. 2021-041176 dated Nov. 29, 2022.
(Continued)

*Primary Examiner* — Amy R Weisberg
*Assistant Examiner* — Dana D Ivey
(74) *Attorney, Agent, or Firm* — Amin, Turocy & Watson, LLP

(57) ABSTRACT

The vehicle body rear structure includes a floor panel 2, a subframe 3 which is provided below the floor panel 2, an impact absorbing member 4 which is provided behind the subframe 3 and extends in the front-rear direction, and a bracket which detachably attaches the impact absorbing member 4 to a lower surface of the floor panel 2. The front end portion 38 of the impact absorbing member 4 is disposed to be at the same height as the subframe 3 in the vertical direction and is disposed with the spacing S from the subframe 3 in the front-rear direction.

11 Claims, 5 Drawing Sheets

(51) Int. Cl.
*B62D 21/11* (2006.01)
*B60K 15/063* (2006.01)
*B60K 15/067* (2006.01)
*B60K 15/03* (2006.01)

(52) U.S. Cl.
CPC .............. *B60K 2015/03375* (2013.01); *B60K 2015/0634* (2013.01); *B62D 21/11* (2013.01); *B62D 21/155* (2013.01); *B62D 25/20* (2013.01)

(58) Field of Classification Search
USPC ..................................................... 296/187.11
See application file for complete search history.

(56) References Cited

U.S. PATENT DOCUMENTS

| | | |
|---|---|---|
| 2006/0087109 A1 | 4/2006 | Kusu et al. |
| 2011/0316295 A1 | 12/2011 | Yamada et al. |
| 2014/0333056 A1 | 11/2014 | Yoshida et al. |
| 2020/0101914 A1 | 4/2020 | Sakai et al. |
| 2020/0172167 A1 | 6/2020 | Watanabe et al. |

FOREIGN PATENT DOCUMENTS

| | | |
|---|---|---|
| CN | 110949512 | 4/2020 |
| CN | 111032493 | 4/2020 |
| JP | 2009-067376 | 4/2009 |
| JP | 2017-100692 | 6/2017 |
| JP | 2018-039315 | 3/2018 |
| JP | 2019-026237 | 2/2019 |
| JP | 2020-055467 | 4/2020 |
| WO | 2013/088896 | 6/2013 |

OTHER PUBLICATIONS

Chinese Notice of Allowance for Chinese Patent Application No. 202210088773.4 dated Oct. 30, 2023.

\* cited by examiner

VEHICLE BODY REAR STRUCTURE

CROSS-REFERENCE TO RELATED APPLICATION

Priority is claimed on Japanese Patent Application No. 2021-041176, filed Mar. 15, 2021, the content of which is incorporated herein by reference.

BACKGROUND OF THE INVENTION

Field of the Invention

The present invention relates to a vehicle body rear structure.

Description of Related Art

In the related art, a vehicle body rear structure in which various in-vehicle parts are mounted in the vicinity of a floor panel in a rear portion of a vehicle is known. In such a vehicle, various technologies are proposed for improving the safety of an occupant by absorbing impact energy at the time of a rear collision while protecting in-vehicle parts.

For example, Patent Document 1 (Japanese Unexamined Patent Application, First Publication No. 2009-67376) discloses a vehicle body rear structure that has a torsion beam disposed behind a side sill, a floor pan protruding downward, and a rear center frame (an impact absorbing member) extending in a front-rear direction along a lower surface of the floor pan. The rear center frame is disposed behind the torsion beam.

According to the technology described in Patent Document 1, in an initial stage of a rear collision, impact energy is absorbed by a rear portion of the rear center frame formed in an uneven shape being crushed. In a later stage of the rear collision, the impact energy is absorbed by the rear center frame coming into contact with the torsion beam. Therefore, the impact energy can be absorbed in a short stroke and the safety of the occupant can be ensured.

SUMMARY OF THE INVENTION

Incidentally, a vehicle that travels using a gas fuel such as hydrogen gas as a fuel is known. In such a vehicle, a floor panel may be raised upward and a fuel tank may be disposed in this raised portion. In this case, an opening of the floor panel is formed below the fuel tank. Therefore, the impact absorbing member cannot be disposed along the lower surface of the floor panel in a portion corresponding to the fuel tank in the front-rear direction. As a result, a spacing between a member such as the torsion beam that receives a load and the impact absorbing member becomes large, and thus the impact absorbing member becomes idle at the time of a rear collision, and a vehicle body may be significantly deformed. Further, since the spacing between the member that receives a load and the impact absorbing member is large, a retreat angle of the impact absorbing member changes with the movement at the time of a rear collision, and the impact absorbing member may not come into contact with the torsion beam.

Therefore, in the related art described in Patent Document 1, there is room for improvement in terms of reliably absorbing impact energy and improving the safety of an occupant even in a case where the vehicle body rear structure is applied to a vehicle in which the fuel tank is disposed below the floor panel.

Therefore, an object of the present invention is to provide a vehicle body rear structure capable of reliably absorbing impact energy and improving the safety of an occupant even in a case where the vehicle body rear structure is applied to a vehicle in which a fuel tank is disposed below a floor panel.

In order to solve the above problems, a vehicle body rear structure according to the present invention has the following configurations.

(1) A vehicle body rear structure according to an aspect of the present invention includes: a floor panel; a subframe which is provided below the floor panel in a vertical direction of a vehicle body; an impact absorbing member which is provided behind the subframe in a front-rear direction of the vehicle body and extends in the front-rear direction; and a bracket which detachably attaches the impact absorbing member to a lower surface of the floor panel, wherein the floor panel has a floor pan having the lower surface to which the impact absorbing member is attached, wherein the impact absorbing member has a first extending portion which is provided along the lower surface of the floor pan, and a second extending portion which is integrally formed with the first extending portion and extends forward with respect to the floor pan in the front-rear direction, and wherein a front end portion of the impact absorbing member is disposed to be at the same height as the subframe in the vertical direction and is disposed with a spacing from the subframe in the front-rear direction.

(2) In the vehicle body rear structure according to the aspect of (1), the floor panel may have a recess that opens downward by being curved such that the floor panel is raised upward, and the impact absorbing member may extend in the front-rear direction to straddle an opening trailing edge of the recess.

(3) In the vehicle body rear structure according to the aspect of (1), the floor panel may have a recess that opens downward by being curved such that the floor panel is raised upward, the bracket may be formed in an L shape or a U shape straddling an opening trailing edge of the recess, and the subframe may have a contacted surface that faces the front end portion of the impact absorbing member.

(4) In the vehicle body rear structure according to the aspect of (3), the bracket may have a nut portion into which a fastening member is fastened, and the impact absorbing member may be connected to the bracket via a spacer disposed between the impact absorbing member and the bracket.

(5) In the vehicle body rear structure according to the aspect of (1), the floor panel may have a recess that opens downward by being curved such that the floor panel is raised upward, and a fuel tank may be disposed in the recess of the floor panel.

(6) In the vehicle body rear structure according to the aspect of (5), the subframe may be fixed to a vehicle body frame below the fuel tank.

(7) In the vehicle body rear structure according to the aspect of (1), the impact absorbing member may have a main body portion which is formed in a shape of a hollow pipe, and a reinforcing portion which is provided inside the main body portion and extends in a longitudinal direction of the impact absorbing member.

(8) In the vehicle body rear structure according to the aspect of (7), a front portion of the impact absorbing member may be provided with a fragile portion.

(9) In the vehicle body rear structure according to the aspect of (7), the impact absorbing member may have a bolt fastening hole provided in an upper surface of the main body portion, and a bolt inserting hole provided in a lower surface of the main body portion.

(10) In the vehicle body rear structure according to the aspect of (1), a rear end portion of the subframe may be provided with a contacted surface that faces the front end portion of the impact absorbing member and has the front-rear direction as a direction perpendicular to a surface, the contacted surface may be inclined to be located from the front to the rear as it goes from the inside to the outside in a vehicle width direction of the vehicle body when seen in the vertical direction, and the front end portion of the impact absorbing member facing the contacted surface may be inclined to be parallel to the contacted surface when seen in the vertical direction.

(11) In the vehicle body rear structure according to the aspect of (1), a pair of the impact absorbing members may be provided on left and right to be side by side with each other in a vehicle width direction of the vehicle body.

According to the aspect of (1), the impact absorbing member is detachably attached to the lower surface of the floor pan located at the rear portion of the floor panel via the bracket. The impact absorbing member has the first extending portion along the floor panel (the floor pan) and the second extending portion that extends forward with respect to the floor pan. As a result, the front end portion of the impact absorbing member can be disposed in front of the floor pan. Therefore, for example, the vehicle body rear structure of the present embodiment can be applied even in a case where the fuel tank or the like is disposed below the floor panel. That is, even in a case where the impact absorbing member cannot be disposed along the floor panel in front of the floor pan, the impact absorbing member can be extended forward to a desired position in the front-rear direction.

The subframe is disposed in front of the impact absorbing member. The front end portion of the impact absorbing member is disposed to be at the same height as the subframe in the vertical direction and is disposed with the spacing from the subframe in the front-rear direction. As a result, even in a case where the floor panel has the opening on the lower surface thereof, it is possible to dispose the subframe and the front end portion of the impact absorbing member in a state where they are brought close to each other as compared with the related art in which the impact absorbing member is disposed along the floor panel. Therefore, it is possible to prevent the impact absorbing member from becoming idle at the time of a rear collision and effectively absorb the impact energy at the time of a rear collision.

Since the impact absorbing member is brought into contact with the subframe, it is possible to prevent the height positions of the impact absorbing member and the subframe from deviating from each other during a rear collision. That is, as compared with the related art in which the impact absorbing member is brought into contact with a torsion beam which is easily displaced in the vertical direction with respect to the vehicle body due to a relationship with a suspension, the subframe is fixed to the vehicle body, and thus a deviation in a relative position between the impact absorbing member also attached to the vehicle body and the subframe less likely occurs. As a result, the impact absorbing member and the subframe can be reliably brought into contact with each other at the time of a rear collision. Therefore, the impact absorbing member can reliably absorb the impact energy at the time of a rear collision.

Therefore, it is possible to provide the vehicle body rear structure capable of reliably absorbing the impact energy and improving the safety of an occupant even in a case where the vehicle body rear structure is applied to a vehicle in which the fuel tank is disposed below the floor panel.

According to the aspect of (2), the floor panel has the recess and the opening, and the impact absorbing member extends in the front-rear direction to straddle the opening trailing edge of the recess. As a result, after the subframe and the fuel tank are disposed below the recess of the floor panel, the impact absorbing member can be attached from below. Since the impact absorbing member is attached after the subframe, the impact absorbing member can be disposed at a desired position in accordance with the subframe, and the front end portion of the impact absorbing member can be brought close to the subframe. Therefore, the subframe and the impact absorbing member can be surely brought into contact with each other at the time of a rear collision, and the impact energy can be effectively absorbed by the impact absorbing member.

According to the aspect of (3), the bracket is formed in the L shape or the U shape straddling the opening trailing edge of the recess of the floor panel. This makes it easy to adjust the inclination of the bracket or the like when the impact absorbing member is attached. Therefore, the attachment angle or the posture of the impact absorbing member with respect to the floor panel can be easily adjusted. The subframe has the contacted surface at a position facing the front end portion of the impact absorbing member. As a result, the impact absorbing member can be reliably brought into contact with the subframe at the time of a rear collision. Since the impact absorbing member is attached using an L shaped or U shaped bracket, the impact absorbing member can be attached such that the contacted surface of the subframe and the front end portion of the impact absorbing member face each other. Therefore, the load from the impact absorbing member can be effectively transmitted to the subframe, and the impact energy at the time of a rear collision can be absorbed.

According to the aspect of (4), the bracket has the nut portion, and the spacer is disposed between the impact absorbing member and the bracket. In particular, the height position of the impact absorbing member in the vertical direction can be easily adjusted by changing the number of the spacers, the size of the spacer, or the like. Therefore, the position of the impact absorbing member can be adjusted not only by the bracket but also by the spacer, and the impact absorbing member can be easily attached from below the vehicle body.

According to the aspect of (5), the floor panel has the recess that opens downward, and the fuel tank is disposed in the recess of the floor panel. Since the recess is provided in the floor panel, the fuel tank can be accommodated below the floor panel (inside the recess). Since the recess opens downward, the fuel tank can be disposed from below the vehicle body. Therefore, the workability at the time of manufacturing can be improved. Further, since the subframe and the impact absorbing member can be disposed below the fuel tank, the subframe and the impact absorbing member can absorb the impact energy at the time of a rear collision. Therefore, it is possible to obtain the vehicle body rear structure which is particularly suitable for a vehicle in which the fuel tank is disposed in the floor panel having the recess raised upward.

According to the aspect of (6), the subframe is fixed to the vehicle body frame below the fuel tank. Since the subframe is fixed to the vehicle body frame, the position deviation between the impact absorbing member also attached to the vehicle body frame via the floor panel and the subframe can be suppressed. Therefore, the impact absorbing member and the subframe can be reliably brought into contact with each other at the time of a rear collision, and the impact energy can be effectively absorbed.

According to the aspect of (7), the impact absorbing member has the pipe-shaped main body portion and the reinforcing portion provided inside the main body portion. The reinforcing portion extends in the longitudinal direction of the impact absorbing member (the main body portion). By configuring the impact absorbing member in this way, for example, by extrusion-molding a metal such as an aluminum alloy, it is possible to easily manufacture the impact absorbing member. Since the main body portion is formed in the shape of a hollow pipe, the weight of the impact absorbing member can be reduced. Since the reinforcing portion extends in the longitudinal direction, it is possible to increase the rigidity of the impact absorbing member with respect to the load at the time of a rear collision by providing the reinforcing portion. Therefore, the impact energy at the time of a rear collision can be effectively absorbed. In particular, in a case where the wall-shaped reinforcing portion is provided to partition the inside of the main body portion, it is possible to obtain a suitable configuration that achieves both improvement in manufacturability and improvement in impact resistance.

According to the aspect of (8), the front portion of the impact absorbing member is provided with the fragile portion. As a result, the front portion of the impact absorbing member becomes fragile as compared with the rear portion of the impact absorbing member. Therefore, at the time of a rear collision, the impact energy can be absorbed by the front portion of the impact absorbing member being collapsed. Further, by suppressing the deformation of the rear portion of the impact absorbing member connected to the floor panel, it is possible to suppress the deformation of the rear portion of the vehicle body. Therefore, since the rear portion of the impact absorbing member can maintain its shape until the impact absorbing member comes into contact with the subframe, the impact energy transmitted to the rear portion of the impact absorbing member can be effectively transmitted to the subframe. Therefore, the impact absorbing member and the subframe can effectively absorb the impact energy at the time of a rear collision.

According to the aspect of (9), the impact absorbing member has the bolt fastening hole and the bolt inserting hole. Since the bolt fastening hole is provided in the upper surface of the impact absorbing member, the impact absorbing member can be fastened to the bracket through the bolt fastening hole. Since the bolt inserting hole is provided in the lower surface of the impact absorbing member, for example, when the impact absorbing member is attached from below the vehicle body, the bolt can be inserted into the bolt inserting hole to access the bolt fastening hole in the upper surface. Thereby, the attachment workability of the impact absorbing member can be improved. At the time of a rear collision, the bolt inserting hole in the lower surface functions as a fragile portion, and thus the impact absorbing member bends to protrude downward with the bolt insertion hole as a starting point. As a result, even in a case where the impact absorbing member is deformed, the fuel tank provided above the impact absorbing member and the impact absorbing member do not interfere with each other. Therefore, the fuel tank can be protected from the impact.

According to the aspect of (10), the subframe has the contacted surface at the rear end portion thereof. The contacted surface is inclined to be located from the front to the rear as it goes from the inside to the outside in the vehicle width direction. The front end portion of the impact absorbing member facing the contacted surface is inclined to be parallel to the contacted surface when seen in the vertical direction. As a result, the front end portion of the impact absorbing member and the contacted surface of the subframe come into surface contact with each other, and thus the impact energy input to the impact absorbing member can be reliably transmitted to the subframe. Since the contacted surface and the front end portion of the impact absorbing member are inclined when seen in the vertical direction, the load transmitted from the impact absorbing member to the subframe is distributed in the front-rear direction and the vehicle width direction. As a result, the load input to the impact absorbing member can be dispersed over the entire vehicle body frame. Therefore, the impact energy can be effectively absorbed, and the deformation of the vehicle body rear portion can be suppressed.

According to the aspect of (11), the pair of impact absorbing members are provided on the left and right sides to be side by side with each other in the vehicle width direction. As a result, the impact energy at the time of a rear collision is uniformly dispersed and transmitted by the left and right impact absorbing members and the subframe. Further, it is possible to suppress the occurrence of tilting of the vehicle body rear portion to the left and right sides at the time of a rear collision. Therefore, the deformation of the vehicle body rear portion can be effectively suppressed.

DETAILED DESCRIPTION OF THE INVENTION

Hereinafter, embodiments of the present invention will be described with reference to the drawings. In the following description, a front-rear direction, a left-right direction, and an up-down direction coincide with a front-back direction, a left-right direction, and a vertical direction of a vehicle (not shown) having a vehicle body rear structure 1. The left-right direction may be referred to as a vehicle width direction. In the figure, an arrow FR indicates forward with respect to a vehicle body, an arrow UP indicates upward with respect to the vehicle body, and an arrow LH indicates leftward with respect to the vehicle body.

Vehicle Body Rear Structure

Figure 1:
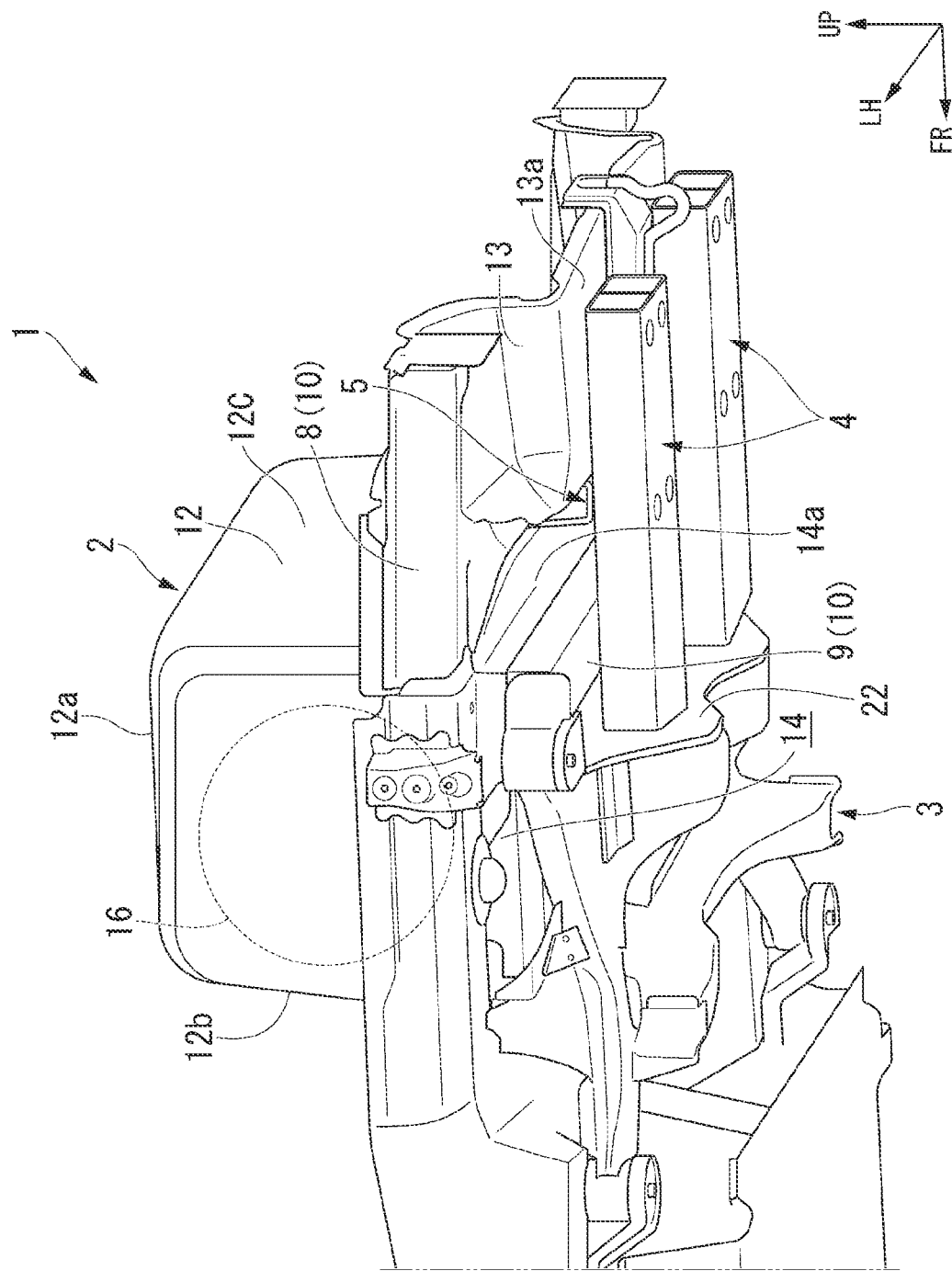
FIG. 1 is a perspective view of a vehicle body rear structure according to an embodiment.
Figure 2:
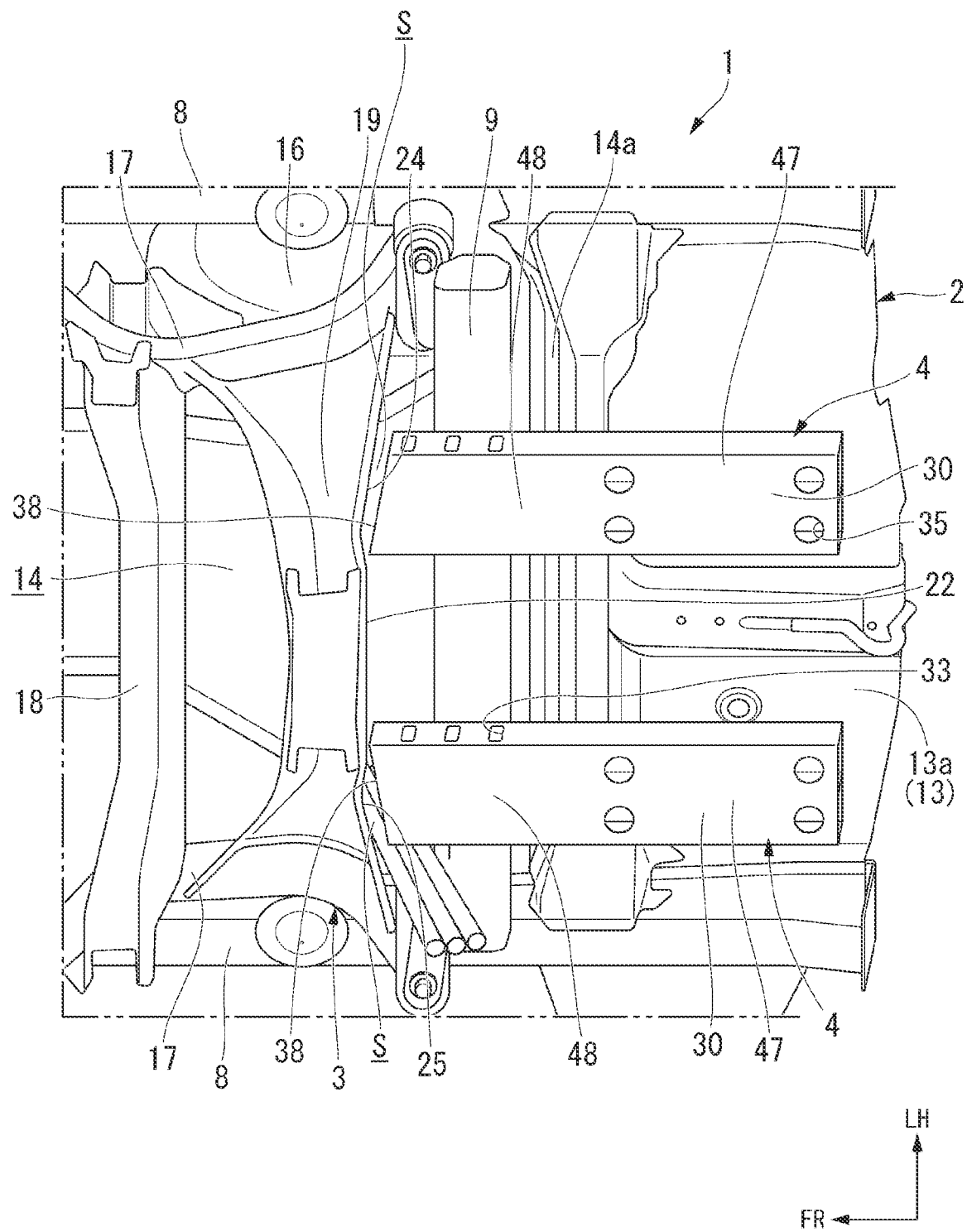
FIG. 2 is a perspective view of the vehicle body rear structure according to the embodiment from below.
Figure 3:
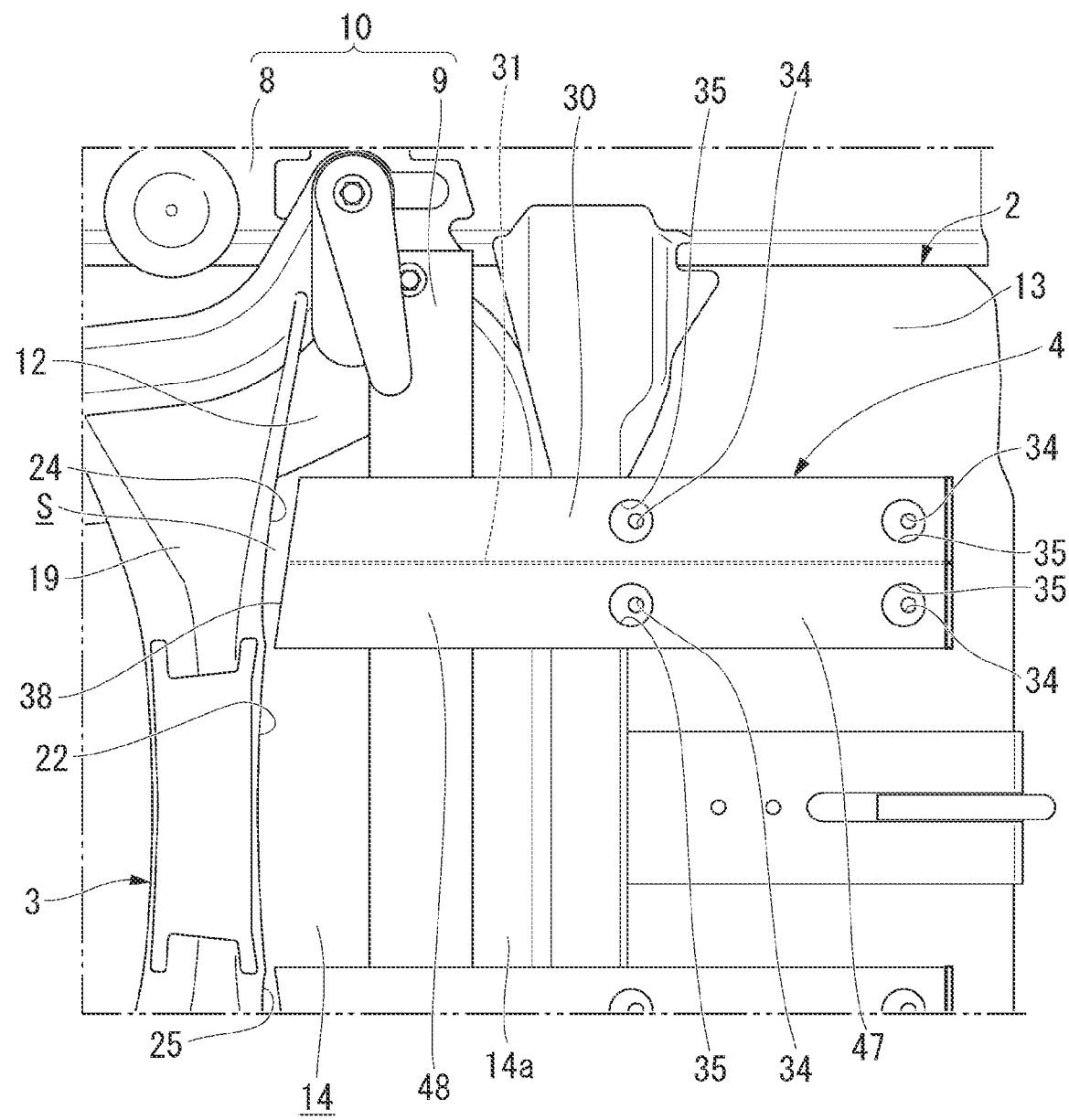
FIG. 3 is an enlarged bottom view of an impact absorbing member according to the embodiment.
Figure 3:
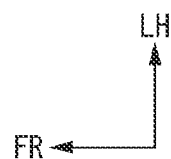

FIG. 1 is a perspective view of the vehicle body rear structure 1 according to the embodiment according to the embodiment from the lower rear. FIG. 2 is a perspective view of the vehicle body rear structure 1 according to the embodiment from below. FIG. 3 is an enlarged bottom view of an impact absorbing member 4 according to the embodiment.

As shown in FIG. 1, the vehicle body rear structure 1 is provided at a rear portion of a vehicle (not shown) such as an automobile. The vehicle is, for example, a natural gas vehicle that travels using a gas fuel such as natural gas or hydrogen gas as fuel, a fuel cell vehicle that travels using power generated by a fuel gas, or the like. The vehicle body rear structure 1 of the present embodiment is a rear portion structure for protecting an occupant by absorbing impact energy in the front-rear direction in a vehicle in which a fuel tank 16 filled with a gas fuel is mounted under a floor.

The vehicle body rear structure 1 of the present embodiment is applied to a vehicle in which, for example, a passenger compartment that an occupant enters and a luggage compartment located behind the passenger compartment (neither is shown) are continuous (for example, a one-box car or the like). In other words, the vehicle body rear structure 1 of the present embodiment is applied to a vehicle in which there is no distinction between the passenger compartment and the luggage compartment and the rigidity of a floor rear portion is guaranteed by the floor alone. The vehicle body rear structure 1 includes a vehicle body frame 10, a floor panel 2, a subframe 3, a bracket 5, and an impact absorbing member 4.

Vehicle Body Frame

The vehicle body frame 10 is a member constituting a frame of the vehicle body. The vehicle body frame 10 has a side sill 8 and a cross member 9.

A pair of side sills 8 are provided on left and right sides to be separated from each other in the vehicle width direction. The pair of side sills 8 each extend in the front-rear direction of the vehicle. The cross member 9 extends in the vehicle width direction between the pair of side sills 8. A plurality of cross members 9 are provided to be separated from each other in the front-rear direction. In the present embodiment, the cross members 9 are each provided in front of and behind a recess 12 of the floor panel 2, which will be described in detail later.

Floor Panel

The floor panel 2 is provided at a lower portion of the vehicle body and constitutes a floor surface of the passenger compartment. The floor panel 2 is provided between the pair of left and right side sills 8. Both end portions of the floor panel 2 in the vehicle width direction are fixed to the side sills 8. The floor panel 2 is provided above the cross member 9.

The floor panel 2 has a recess 12 and a floor pan 13.

The recess 12 is formed to be recessed upward when seen from below by being curved such that a panel member constituting the floor panel 2 is raised upward. The recess 12 is formed to open downward. In other words, a lower surface of the floor panel 2 has an opening 14. The recess 12 is provided at a position between the passenger compartment and the luggage compartment in the front-rear direction. The recess 12 is formed in a rectangular shape having an upper wall 12a, a front wall 12b, and a rear wall 12c in a side view seen in the vehicle width direction. The fuel tank 16 is accommodated below the floor panel 2 and inside the recess 12.

The floor pan 13 constitutes a rear portion of the floor panel 2. The floor pan 13 is provided behind the recess 12. The floor pan 13 is formed to bulge downward as compared with a front portion of the floor panel 2 having the recess 12. In other words, a lower surface 13a of the floor pan 13 is located below the opening 14 (an opening surface) of the recess 12. The lower surface 13a of the floor pan 13 is formed in a plane shape substantially parallel to a horizontal direction.

In the following description, a trailing edge portion of the opening 14 of the recess 12 may be referred to as an opening trailing edge 14a. The opening trailing edge 14a is located at a position corresponding to the rear wall 12c of the recess 12 in the front-rear direction.

Subframe

As shown in FIGS. 1 and 2, the subframe 3 is provided below the floor panel 2 and the fuel tank 16. The subframe 3 is provided at a position corresponding to the opening 14 of the floor panel 2 when seen in the vertical direction. The subframe 3 covers the opening 14 of the floor panel 2 from below. The subframe 3 has a pair of arms 17, a front beam 18, a rear beam 19, and a contacted surface 22. The pair of arms 17, the front beam 18, the rear beam 19, and the contacted surface 22 are integrally formed with each other.

As shown in FIG. 2, the pair of arms 17 are provided on left and right sides. The arms 17 extend in the front-rear direction. Each of the pair of arms 17 is gently curved such that a central portion in the front-rear direction is located inside in the vehicle width direction with respect to a front end portion and a rear end portion. The front end portion and the rear end portion of each of the pair of arms 17 are fixed to the vehicle body frame 10. In the present embodiment, the front end portion and the rear end portion of each arm 17 are attached to the side sill 8 via a connecting bracket (not shown). As a result, the subframe 3 is fixed to the vehicle body frame 10.

The front beam 18 is provided between the pair of arms 17. The front beam 18 extends in the vehicle width direction. Each of left and right end portions of the front beam 18 is connected to one of the pair of arms 17. The front beam 18 is formed in a U shape that opens upward in a cross-sectional view orthogonal to a longitudinal direction thereof. The front beam 18 may be formed in a frame shape having a closed cross section, for example.

The rear beam 19 is provided between the pair of arms 17. The rear beam 19 is provided at a distance rearward from the front beam 18. The rear beam 19 extends in the vehicle width direction. Each of left and right end portions of the rear beam 19 is connected to one of the pair of arms 17. The rear beam 19 is formed in a plate shape with the vertical direction as a thickness direction. When seen in the vertical direction, a front side of the rear beam 19 is inclined to be located from the rear to the front as it goes from the inside to the outside in the vehicle width direction. Therefore, a width dimension of the rear beam 19 in the front-rear direction increases from the inside to the outside in the vehicle width direction.

The contacted surface 22 (see also FIG. 1) is connected to a rear end portion of the rear beam 19. The contacted surface 22 is formed in a plate shape having the front-rear direction as a direction perpendicular to a surface. The contacted surface 22 is formed by, for example, bending the rear end portion of the rear beam 19 in the vertical direction. The contacted surface 22 is provided over the entire rear side of the rear beam 19 in a longitudinal direction thereof. When seen in the vertical direction, the contacted surface 22 has a portion inclined to be located from the front to the rear as it goes from the inside to the outside in the vehicle width direction (see also FIG. 3). Specifically, in the present embodiment, the contacted surface 22 has a first inclined surface 24 and a second inclined surface 25.

The first inclined surface 24 is provided on a left side of the contacted surface 22 with respect to a central portion in the vehicle width direction. The first inclined surface 24 is inclined to be located from the front to the rear as it goes from the inside (the central portion) to the outside (the left side) in the vehicle width direction.

The second inclined surface 25 is provided on a right side of the contacted surface 22 with respect to a central portion in the vehicle width direction. The second inclined surface 25 is inclined to be located from the front to the rear as it goes from the inside (the central portion) to the outside (the right side) in the vehicle width direction.

A portion of the contacted surface 22 between the first inclined surface 24 and the second inclined surface 25 is provided with a surface substantially parallel to the vehicle width direction. An inner end portion of the first inclined surface 24 in the vehicle width direction and an inner end portion of the second inclined surface 25 in the vehicle width direction may be continuously provided.

Bracket

Figure 4:
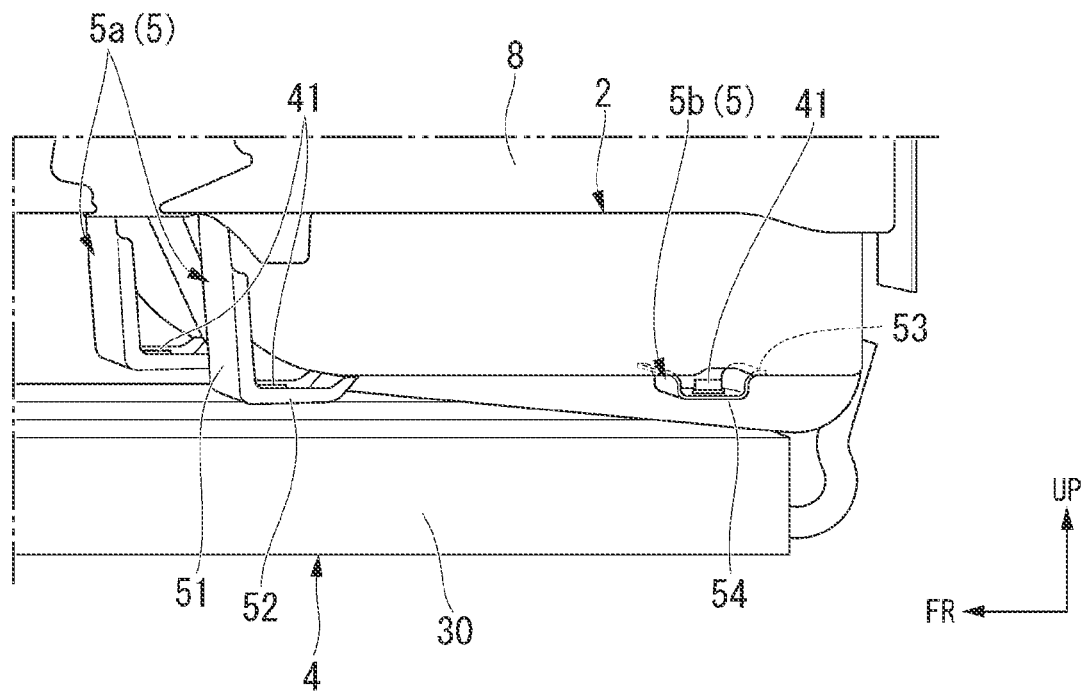
FIG. 4 is a side view of a rear portion of the impact absorbing member according to the embodiment.

FIG. 4 is a side view of a rear portion of the impact absorbing member 4 according to the embodiment.

As shown in FIG. 4, the bracket 5 is provided on the lower surface of the floor panel 2. The bracket 5 detachably attaches the impact absorbing member 4 to the lower surface 13a of the floor panel 2 (the floor pan 13). The bracket 5 is formed in an L shape or a U shape straddling the opening trailing edge 14a (see FIG. 2) of the recess 12. In the present embodiment, the bracket 5 has a front bracket 5a and a rear bracket 5b.

The front bracket 5a is formed to straddle the opening trailing edge 14a of the recess 12. The front bracket 5a is formed in an L shape by a vertical portion 51 extending in the vertical direction along a front portion of the floor pan 13 and a horizontal portion 52 extending rearward from a lower end portion of the vertical portion 51. An upper end portion of the front bracket 5a is connected to the floor panel 2 or the floor pan 13. The horizontal portion 52 of the front bracket 5a is provided with a nut portion 41 into which a fastening member such as a bolt can be fastened.

The rear bracket 5b is provided behind the front bracket 5a. The rear bracket 5b is provided on the lower surface 13a of the floor pan 13. The rear bracket 5b is formed in a U shape by a pair of flanges 53 connected to the lower surface 13a of the floor pan 13 and a bulging portion 54 connected to be convex downward from the pair of flanges 53. The bulging portion 54 is provided with a nut portion 41 into which a fastening member such as a bolt can be fastened.

Impact Absorbing Member

As shown in FIGS. 2 and 3, the impact absorbing member 4 is attached to the lower surface 13a of the floor pan 13 via a plurality of brackets 5 (the front bracket 5a and the rear bracket 5b). The impact absorbing member 4 is provided behind the subframe 3 in the front-rear direction. A pair of impact absorbing members 4 are provided on left and right sides to be side by side with each other in the vehicle width direction. Since the pair of impact absorbing members 4 are formed bisymmetrically, a left impact absorbing member 4 will be described in detail in the following description, and the description of overlapping portions of a right impact absorbing member 4 may be omitted.

The impact absorbing member 4 extends in the front-rear direction to straddle the opening trailing edge 14a of the recess 12 in the floor panel 2. A rear portion of the impact absorbing member 4 located behind the opening trailing edge 14a is a first extending portion 47. The first extending portion 47 is provided along the lower surface 13a of the floor pan 13. A front portion of the impact absorbing member 4 located in front of the opening trailing edge 14a is a second extending portion 48. The second extending portion 48 extends in the front-rear direction while protruding forward with respect to the floor pan 13. The first extending portion 47 and the second extending portion 48 are integrally formed with each other. Therefore, with the impact absorbing member 4 attached to the floor panel 2 (the floor pan 13), a front end portion 38 of the impact absorbing member 4 is located in front of the opening trailing edge 14a.

As shown in FIG. 3, the impact absorbing member 4 has a main body portion 30 and a reinforcing portion 31.

The main body portion 30 is formed in a shape of a hollow pipe. The main body portion 30 extends in the front-rear direction. The main body portion 30 is formed in a shape of a rectangular frame in which a portion in the vehicle width direction is longer than a portion in the vertical direction in a cross-sectional view orthogonal to a longitudinal direction thereof (the front-rear direction).

The reinforcing portion 31 is provided inside the main body portion 30. The reinforcing portion 31 extends in the longitudinal direction of the main body portion 30. In the present embodiment, the reinforcing portion 31 is a single partition wall that connects an upper surface and a lower surface of the main body portion 30 and divides a space inside the main body portion 30 into a left portion and a right portion (see also FIG. 6). The main body portion 30 and the reinforcing portion 31 are integrally formed by extrusion-molding a metal material such as an aluminum alloy.

As shown in FIG. 3, the upper surface of the main body portion 30 of the impact absorbing member 4 is provided with a plurality of (four in the present embodiment) bolt fastening holes 34. The bolt fastening hole 34 penetrates the upper surface of the main body portion 30 in the vertical direction. By a bolt being inserted into the bolt fastening hole 34, the impact absorbing member 4 is fastened and fixed to the bracket 5 (see FIG. 4). The lower surface of the main body portion 30 of the impact absorbing member 4 is provided with a plurality of (four in the present embodiment) bolt inserting holes 35. The bolt inserting hole 35 penetrates the lower surface of the main body portion 30 in the vertical direction. The bolt inserting holes 35 is provided at a position overlapping the bolt fastening hole 34 formed on the upper surface when seen in the vertical direction. A size of the bolt inserting hole 35 is equal to or larger than a size of the bolt fastening hole 34.

Figure 5:
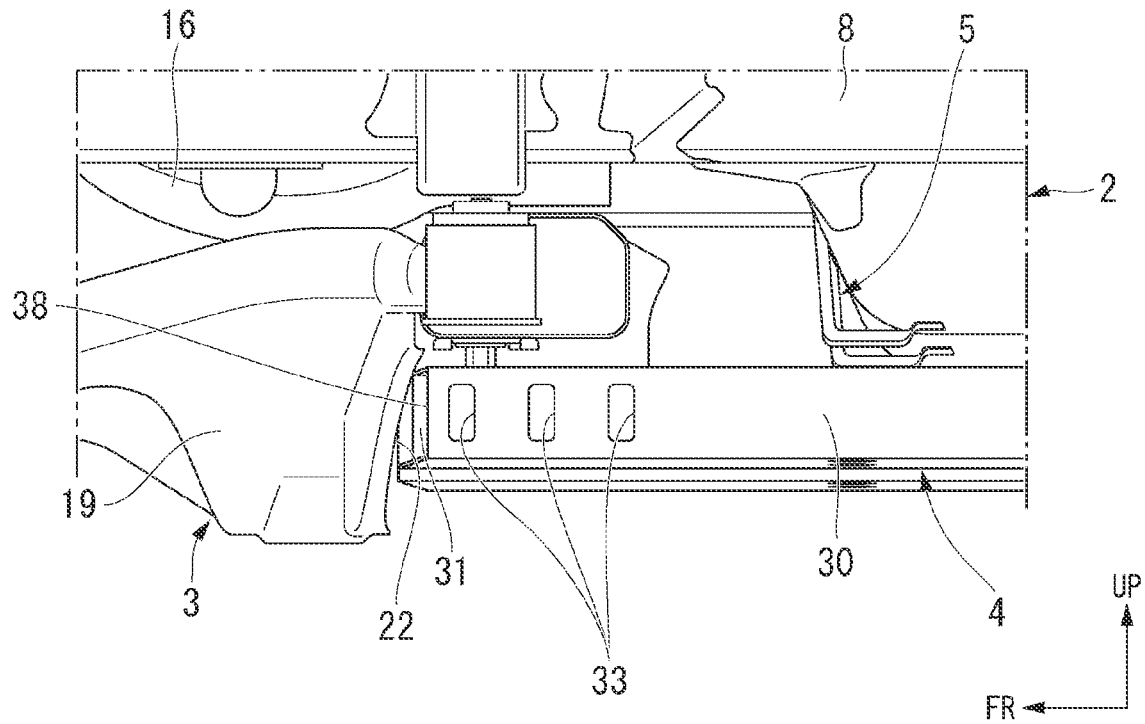
FIG. 5 is a side view of a front portion of the impact absorbing member according to the embodiment.

FIG. 5 is a side view of the front portion of the impact absorbing member 4 according to the embodiment.

As shown in FIG. 5, a side surface of the main body portion 30 of the impact absorbing member 4 is provided with a fragile portion 33. The fragile portion 33 is provided in the front portion of the impact absorbing member 4. The fragile portion 33 is a hole that penetrates the side surface of the main body portion 30 in the left-right direction. When seen in the vehicle width direction, the fragile portion 33 (the hole) is formed in a rectangular shape long in the vertical direction, and a plurality of (three in the present embodiment) fragile portions 33 (holes) are provided side by side in the front-rear direction. The fragile portions 33 are each provided in both the left and right side surfaces of the main body portion 30.

Figure 6:
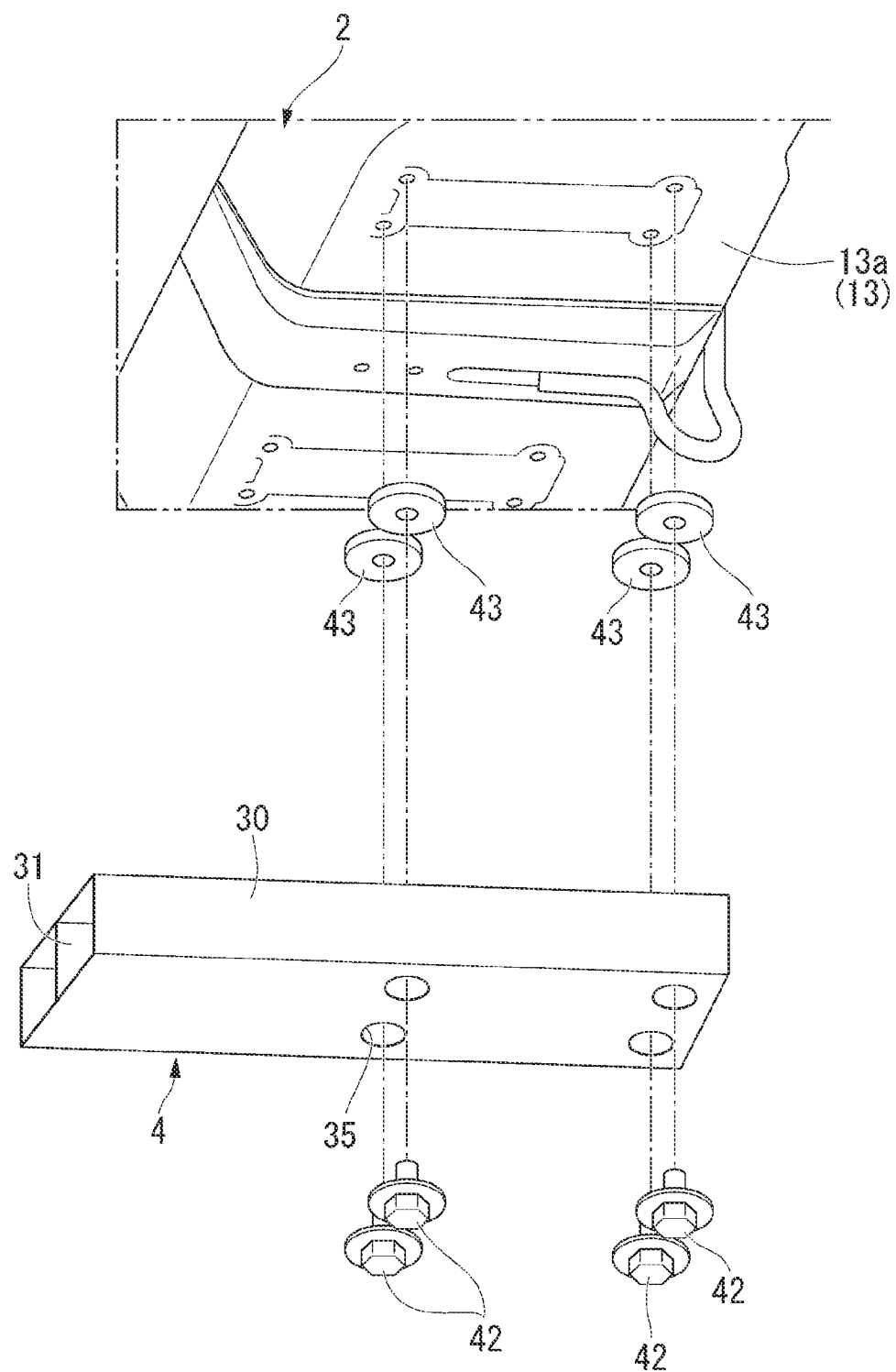
FIG. 6 is an exploded perspective view showing a method of attaching the impact absorbing member according to the embodiment.

FIG. 6 is an exploded perspective view showing a method of attaching the impact absorbing member 4 according to the embodiment. As shown in FIG. 6, a spacer 43 is provided between the impact absorbing member 4 and the bracket 5 (see FIG. 4). In other words, the impact absorbing member 4 is connected to the bracket 5 via the spacer 43 disposed between the impact absorbing member 4 and the bracket 5. The spacer 43 makes it possible to adjust a height position of the impact absorbing member 4 with respect to the floor panel 2 in the vertical direction.

As shown in FIGS. 1 and 3, in a state where the impact absorbing member 4 is attached to the floor panel 2 via the bracket 5 (an attachment state of the impact absorbing member 4), the front end portion 38 of the impact absorbing member 4 is disposed to be at the same height as the subframe 3 in the vertical direction. In the attachment state of the impact absorbing member 4, the front end portion 38 of the impact absorbing member 4 faces the contacted surface 22 of the subframe 3. In the attachment state of the impact absorbing member 4, the front end portion 38 of the impact absorbing member 4 is disposed with a spacing S from the contacted surface 22 of the subframe 3 in the front-rear direction.

Further, in the attachment state of the impact absorbing member 4, the front end portion 38 of the impact absorbing member 4 is inclined to be parallel to the contacted surface 22 when seen in the vertical direction. Specifically, the front end portion 38 of the left impact absorbing member 4 is inclined to be located from the front to the rear as it goes from the inside (the central portion) to the outside (the left side) in the vehicle width direction such that the front end portion 38 is parallel to the first inclined surface 24 of the subframe 3. As shown in FIG. 3, the front end portion 38 of the right impact absorbing member 4 is inclined to be located from the front to the rear as it goes from the inside (the central portion) to the outside (the right side) in the vehicle width direction such that the front end portion 38 is parallel to the second inclined surface 25 of the subframe 3.

Attachment Procedure of Vehicle Body Rear Structure

Next, an attachment procedure of the subframe 3, the bracket 5, and the impact absorbing member 4 constituting the vehicle body rear structure 1 will be described.

In a state before the subframe 3, the bracket 5, and the impact absorbing member 4 are attached, the floor panel 2 and the vehicle body frame 10 are fixed to the vehicle body.

In the attachment procedure of the vehicle body rear structure 1, first, the fuel tank 16 is disposed in and fixed to the recess 12 of the floor panel 2. Next, the subframe 3 is fastened and attached to the lower surface of the floor panel 2 with bolts and the like to cover the opening 14 from below. Finally, the impact absorbing member 4 is fastened and attached to the bracket 5 via the spacer 43 with bolts 42 and the like from below. At this time, the impact absorbing member 4 is attached while an adjustment is performed such that a predetermined spacing S is provided between the impact absorbing member 4 and the subframe 3 and the impact absorbing member 4 is at the same height as the subframe 3. Specifically, the height position of the impact absorbing member 4 in the vertical direction is adjusted by changing a thickness of the spacer 43, the number of the spacers 43, or the like. An attachment angle or a posture of the impact absorbing member 4 is adjusted by changing an angle of the bracket 5 or the like.

As a result, each part in the vehicle body rear structure 1 is attached to the vehicle body.

Method of Absorbing Impact Energy in Vehicle Body Rear Structure

Next, in the above-mentioned vehicle body rear structure 1, a method of absorbing the impact energy in a case where an impact load is input from the rear of the vehicle having the vehicle body rear structure 1 (at the time of a rear collision) will be described.

First, immediately after the load is input to the impact absorbing member 4 (in an initial stage of the rear collision), the impact absorbing member 4 is in non-contact with the subframe 3. After that, as the load input to the impact absorbing member 4 increases, the impact absorbing member 4 moves forward, and the impact absorbing member 4 comes into contact with the contacted surface 22 of the subframe 3. When the load further increases in this state (in a middle stage of the rear collision), the impact energy is transmitted to the subframe 3 while the front portion of the impact absorbing member 4 having the fragile portion 33 is collapsed. As a result, the impact energy is absorbed in the middle stage of the rear collision.

Further, when the load is input to the subframe 3 (in a later stage of the rear collision), the impact energy is absorbed in an easily crushed region of the front end portion of the subframe 3. At this time, since the rear portion of the impact absorbing member 4 is maintained at high rigidity, the load is reliably transmitted from the impact absorbing member 4 to the subframe 3, and the impact energy is absorbed.

Operations and Effects

Next, operations and effects of the vehicle body rear structure 1 described above will be described.

According to the vehicle body rear structure 1 of the present embodiment, the impact absorbing member 4 is detachably attached to the lower surface 13a of the floor pan 13 located at the rear portion of the floor panel 2 via the bracket 5. The impact absorbing member 4 has the first extending portion 47 along the floor panel 2 (the floor pan 13) and the second extending portion 48 that extends forward with respect to the floor pan 13. As a result, the front end portion 38 of the impact absorbing member 4 can be disposed in front of the floor pan 13. Therefore, for example, the vehicle body rear structure 1 of the present embodiment can be applied even in a case where the fuel tank 16 or the like is disposed below the floor panel 2. That is, even in a case where the impact absorbing member 4 cannot be disposed along the floor panel 2 in front of the floor pan 13, the impact absorbing member 4 can be extended forward to a desired position in the front-rear direction.

The subframe 3 is disposed in front of the impact absorbing member 4. The front end portion 38 of the impact absorbing member 4 is disposed to be at the same height as the subframe 3 in the vertical direction and is disposed with the spacing S from the subframe 3 in the front-rear direction. As a result, even in a case where the floor panel 2 has the opening 14 on the lower surface thereof, it is possible to dispose the subframe 3 and the front end portion 38 of the impact absorbing member 4 in a state where they are brought close to each other as compared with the related art in which the impact absorbing member 4 is disposed along the floor panel 2. Therefore, it is possible to prevent the impact absorbing member 4 from becoming idle at the time of a rear collision and effectively absorb the impact energy at the time of a rear collision.

Since the impact absorbing member 4 is brought into contact with the subframe 3, it is possible to prevent the height positions of the impact absorbing member 4 and the subframe 3 from deviating from each other during a rear collision. That is, as compared with the related art in which the impact absorbing member 4 is brought into contact with a torsion beam which is easily displaced in the vertical direction with respect to the vehicle body due to a relationship with a suspension, the subframe 3 is fixed to the vehicle body, and thus a deviation in a relative position between the impact absorbing member 4 also attached to the vehicle body and the subframe 3 less likely occurs. As a result, the impact absorbing member 4 and the subframe 3 can be reliably brought into contact with each other at the time of a rear collision. Therefore, the impact absorbing member 4 can reliably absorb the impact energy at the time of a rear collision.

Therefore, it is possible to provide the vehicle body rear structure 1 capable of reliably absorbing the impact energy and improving the safety of an occupant even in a case where the vehicle body rear structure 1 is applied to a vehicle in which the fuel tank 16 is disposed below the floor panel 2.

The floor panel 2 has the recess 12 and the opening 14, and the impact absorbing member 4 extends in the front-rear direction to straddle the opening trailing edge 14a of the recess 12. As a result, after the subframe 3 and the fuel tank 16 are disposed below the recess 12 of the floor panel 2, the impact absorbing member 4 can be attached from below. Since the impact absorbing member 4 is attached after the subframe 3, the impact absorbing member 4 can be disposed at a desired position in accordance with the subframe 3, and the front end portion 38 of the impact absorbing member 4 can be brought close to the subframe 3. Therefore, the subframe 3 and the impact absorbing member 4 can be surely brought into contact with each other at the time of a rear collision, and the impact energy can be effectively absorbed by the impact absorbing member 4.

The bracket 5 is formed in the L shape or the U shape straddling the opening trailing edge 14a of the recess 12 of the floor panel 2. This makes it easy to adjust the inclination of the bracket 5 or the like when the impact absorbing member 4 is attached. Therefore, the attachment angle or the posture of the impact absorbing member 4 with respect to the floor panel 2 can be easily adjusted. The subframe 3 has the contacted surface 22 at a position facing the front end portion 38 of the impact absorbing member 4. As a result, the impact absorbing member 4 can be reliably brought into contact with the subframe 3 at the time of a rear collision. Since the impact absorbing member 4 is attached using an L shaped or U shaped bracket 5, the impact absorbing member 4 can be attached such that the contacted surface 22 of the subframe 3 and the front end portion 38 of the impact absorbing member 4 face each other. Therefore, the load from the impact absorbing member 4 can be effectively transmitted to the subframe 3, and the impact energy at the time of a rear collision can be absorbed.

The bracket 5 has the nut portion 41, and the spacer 43 is disposed between the impact absorbing member 4 and the bracket 5. In particular, the height position of the impact absorbing member 4 in the vertical direction can be easily adjusted by changing the number of the spacers 43, the size of the spacer 43, or the like. Therefore, the position of the impact absorbing member 4 can be adjusted not only by the bracket 5 but also by the spacer 43, and the impact absorbing member 4 can be easily attached from below the vehicle body.

The floor panel 2 has the recess 12 that opens downward, and the fuel tank 16 is disposed in the recess 12 of the floor panel 2. Since the recess 12 is provided in the floor panel 2, the fuel tank 16 can be accommodated below the floor panel 2 (inside the recess 12). Since the recess 12 opens downward, the fuel tank 16 can be disposed from below the vehicle body. Therefore, the workability at the time of manufacturing can be improved. Further, since the subframe 3 and the impact absorbing member 4 can be disposed below the fuel tank 16, the subframe 3 and the impact absorbing member 4 can absorb the impact energy at the time of a rear collision. Therefore, it is possible to obtain the vehicle body rear structure 1 which is particularly suitable for a vehicle in which the fuel tank 16 is disposed in the floor panel 2 having the recess 12 raised upward.

The subframe 3 is fixed to the vehicle body frame 10 below the fuel tank 16. Since the subframe 3 is fixed to the vehicle body frame 10, the position deviation between the impact absorbing member 4 also attached to the vehicle body frame 10 via the floor panel 2 and the subframe 3 can be suppressed. Therefore, the impact absorbing member 4 and the subframe 3 can be reliably brought into contact with each other at the time of a rear collision, and the impact energy can be effectively absorbed.

The impact absorbing member 4 has the pipe-shaped main body portion 30 and the reinforcing portion 31 provided inside the main body portion 30. The reinforcing portion 31 extends in the longitudinal direction of the impact absorbing member 4 (the main body portion 30). By configuring the impact absorbing member 4 in this way, for example, by extrusion-molding a metal such as an aluminum alloy, it is possible to easily manufacture the impact absorbing member 4. Since the main body portion 30 is formed in the shape of a hollow pipe, the weight of the impact absorbing member 4 can be reduced. Since the reinforcing portion 31 extends in the longitudinal direction, it is possible to increase the rigidity of the impact absorbing member 4 with respect to the load at the time of a rear collision by providing the reinforcing portion 31. Therefore, the impact energy at the time of a rear collision can be effectively absorbed. In particular, in a case where the wall-shaped reinforcing portion 31 is provided to partition the inside of the main body portion 30, it is possible to obtain a suitable configuration that achieves both improvement in manufacturability and improvement in impact resistance.

The front portion of the impact absorbing member 4 is provided with the fragile portion 33. As a result, the front portion of the impact absorbing member 4 becomes fragile as compared with the rear portion of the impact absorbing member 4. Therefore, at the time of a rear collision, the impact energy can be absorbed by the front portion of the impact absorbing member 4 being collapsed. Further, by suppressing the deformation of the rear portion of the impact absorbing member 4 connected to the floor panel 2, it is possible to suppress the deformation of the rear portion of the vehicle body. Therefore, since the rear portion of the impact absorbing member 4 can maintain its shape until the impact absorbing member 4 comes into contact with the subframe 3, the impact energy transmitted to the rear portion of the impact absorbing member 4 can be effectively transmitted to the subframe 3. Therefore, the impact absorbing member 4 and the subframe 3 can effectively absorb the impact energy at the time of a rear collision.

The impact absorbing member 4 has the bolt fastening hole 34 and the bolt inserting hole 35. Since the bolt fastening hole 34 is provided in the upper surface of the impact absorbing member 4, the impact absorbing member 4 can be fastened to the bracket 5 through the bolt fastening hole 34. Since the bolt inserting hole 35 is provided in the lower surface of the impact absorbing member 4, for example, when the impact absorbing member 4 is attached from below the vehicle body, the bolt can be inserted into the bolt inserting hole 35 to access the bolt fastening hole 34 in the upper surface. Thereby, the attachment workability of the impact absorbing member 4 can be improved. At the time of a rear collision, the bolt inserting hole 35 in the lower surface functions as a fragile portion, and thus the impact absorbing member 4 bends to protrude downward with the bolt insertion hole 35 as a starting point. As a result, even in a case where the impact absorbing member 4 is deformed, the fuel tank 16 provided above the impact absorbing member 4 and the impact absorbing member 4 do not interfere with each other. Therefore, the fuel tank 16 can be protected from the impact.

The subframe 3 has the contacted surface 22 at the rear end portion thereof. The contacted surface 22 is inclined to be located from the front to the rear as it goes from the inside to the outside in the vehicle width direction. The front end portion 38 of the impact absorbing member 4 facing the contacted surface 22 is inclined to be parallel to the contacted surface 22 when seen in the vertical direction. As a result, the front end portion 38 of the impact absorbing member 4 and the contacted surface 22 of the subframe 3 come into surface contact with each other, and thus the impact energy input to the impact absorbing member 4 can be reliably transmitted to the subframe 3. Since the contacted surface 22 and the front end portion 38 of the impact absorbing member 4 are inclined when seen in the vertical direction, the load transmitted from the impact absorbing member 4 to the subframe 3 is distributed in the front-rear direction and the vehicle width direction. As a result, the load input to the impact absorbing member 4 can be dispersed over the entire vehicle body frame 10. Therefore, the impact energy can be effectively absorbed, and the deformation of the vehicle body rear portion can be suppressed.

The pair of impact absorbing members 4 are provided on the left and right sides to be side by side with each other in the vehicle width direction. As a result, the impact energy at the time of a rear collision is uniformly dispersed and transmitted by the left and right impact absorbing members 4 and the subframe 3. Further, it is possible to suppress the occurrence of tilting of the vehicle body rear portion to the left and right sides at the time of a rear collision. Therefore, the deformation of the vehicle body rear portion can be effectively suppressed.

The technical scope of the present invention is not limited to the above-described embodiments, and various modifications can be made without departing from the spirit of the present invention.

For example, in the above-described embodiments, the front bracket 5a straddling the opening trailing edge 14a is formed in an L shape, but the present invention is not limited to this. The front bracket 5a may be formed in a U shape to straddle the opening trailing edge 14a.

In the above-described embodiments, the contacted surface 22 is formed by vertically bending the rear end portion of the rear beam 19, but the present invention is not limited to this. For example, the contacted surface 22 may be formed by joining a plate-shaped member to the rear end portion of the rear beam 19.

In a case where the impact absorbing member 4 is disposed at an appropriate height position without providing the spacer 43, the spacer 43 may be omitted.

The subframe 3 only has to be fixed to the vehicle body frame 10, and the present invention is not limited to the configuration in which the pair of arms 17 are attached to the side sills 8. The arms 17 of the subframe 3 may be connected to the cross member 9.

The cross-sectional shape of the impact absorbing member 4 and the shape of the holes in the fragile portion 33 are not limited to the shapes of the above-described embodiments. As the fragile portion 33, a slit, a notch, a bead extending in a direction orthogonal to the load transmission direction, an unevenness, or the like may be provided instead of the hole.

As the reinforcing portion 31 of the impact absorbing member 4, a bead in the longitudinal direction may be provided instead of the partition wall.

In addition, it is possible to appropriately replace the constituent elements in the above-described embodiments with well-known constituent elements without departing from the spirit of the present invention, and the above-described embodiments may be combined as appropriate.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

EXPLANATION OF REFERENCES

1 Vehicle body rear structure
2 Floor panel
3 Subframe
4 Impact absorbing member
5 Bracket
10 Vehicle body frame
12 Recess
13 Floor pan
13a Lower surface (of floor pan)
14a Opening trailing edge
16 Fuel tank
22 Contacted surface
30 Main body portion
31 Reinforcing portion
33 Fragile portion
34 Bolt fastening hole
35 Bolt inserting hole
37 Front end portion (of impact absorbing member)
41 Nut portion
43 Spacer
47 First extending portion
48 Second extending portion
S Spacing

What is claimed is:
1. A vehicle body rear structure comprising:
a floor panel;
a subframe which is provided below the floor panel in a vertical direction of a vehicle body;
an impact absorbing member which is provided behind the subframe in a front-rear direction of the vehicle body and extends in the front-rear direction; and a bracket which detachably attaches the impact absorbing member to a lower surface of the floor panel, wherein the floor panel has a floor pan having the lower surface to which the impact absorbing member is attached, wherein the impact absorbing member has a first extending portion which is provided along the lower surface of the floor pan, and a second extending portion which is integrally formed with the first extending portion and extends forward with respect to the floor pan in the front-rear direction, and wherein a front end portion of the impact absorbing member is disposed to be at the same height as the subframe in the vertical direction and is disposed with a spacing from the subframe in the front-rear direction.

2. The vehicle body rear structure according to claim 1, wherein the floor panel has a recess that opens downward by being curved such that the floor panel is raised upward, and wherein the impact absorbing member extends in the front-rear direction to straddle an opening trailing edge of the recess.

3. The vehicle body rear structure according to claim 1, wherein the floor panel has a recess that opens downward by being curved such that the floor panel is raised upward, wherein the bracket is formed in an L shape or a U shape straddling an opening trailing edge of the recess, and wherein the subframe has a contacted surface that faces the front end portion of the impact absorbing member.

4. The vehicle body rear structure according to claim 3, wherein the bracket has a nut portion into which a fastening member is fastened, and wherein the impact absorbing member is connected to the bracket via a spacer disposed between the impact absorbing member and the bracket.

5. The vehicle body rear structure according to claim 1, wherein the floor panel has a recess that opens downward by being curved such that the floor panel is raised upward, and wherein a fuel tank is disposed in the recess of the floor panel.

6. The vehicle body rear structure according to claim 5, wherein the subframe is fixed to a vehicle body frame below the fuel tank.

7. The vehicle body rear structure according to claim 1, wherein the impact absorbing member has a main body portion which is formed in a shape of a hollow pipe, and a reinforcing portion which is provided inside the main body portion and extends in a longitudinal direction of the impact absorbing member.

8. The vehicle body rear structure according to claim 7, wherein a front portion of the impact absorbing member is provided with a fragile portion.

9. The vehicle body rear structure according to claim 7, wherein the impact absorbing member has a bolt fastening hole provided in an upper surface of the main body portion, and a bolt inserting hole provided in a lower surface of the main body portion.

10. The vehicle body rear structure according to claim 1, wherein a rear end portion of the subframe is provided with a contacted surface that faces the front end portion of the impact absorbing member and has the front-rear direction as a direction perpendicular to a surface, wherein the contacted surface is inclined to be located from the front to the rear as it goes from the inside to the outside in a vehicle width direction of the vehicle body when seen in the vertical direction, and wherein the front end portion of the impact absorbing member facing the contacted surface is inclined to be parallel to the contacted surface when seen in the vertical direction.

11. The vehicle body rear structure according to claim 1, wherein a pair of the impact absorbing members are provided on left and right to be side by side with each other in a vehicle width direction of the vehicle body.

* * * * *